No. 825,902. PATENTED JULY 17, 1906.
B. A. GOMME.
APPARATUS FOR TEACHING TIME.
APPLICATION FILED OCT. 14, 1904.

UNITED STATES PATENT OFFICE.

BEN A. GOMME, OF EDDYVILLE, NEBRASKA.

APPARATUS FOR TEACHING TIME.

No. 825,902.      Specification of Letters Patent.      Patented July 17, 1906.

Application filed October 14, 1904. Serial No. 228,434.

*To all whom it may concern:*

Be it known that I, BEN A. GOMME, a citizen of the United States, residing at Eddyville, in the county of Dawson and State of Nebraska, have invented new and useful Improvements in Apparatus for Teaching Time, of which the following is a specification.

My invention relates to an apparatus for teaching the time or the duration or comparative value of tones in music; and it consists in certain novel features of construction hereinafter described and claimed.

Figure 1:
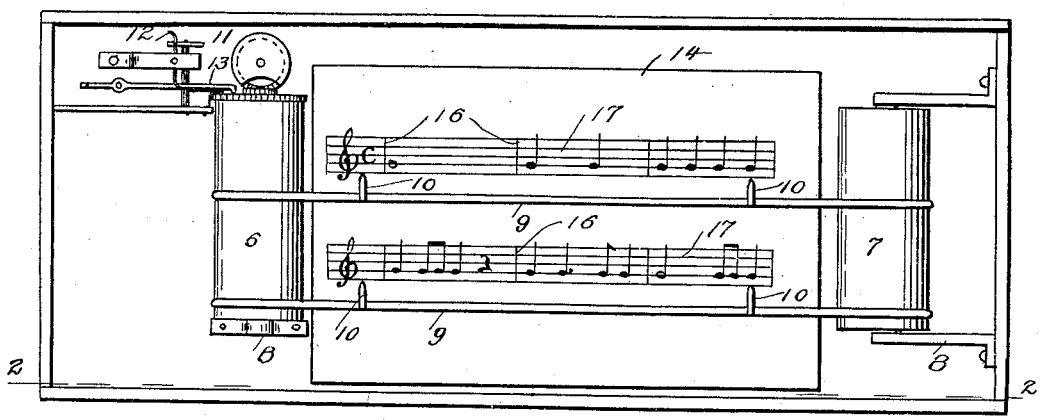
Figure 2:
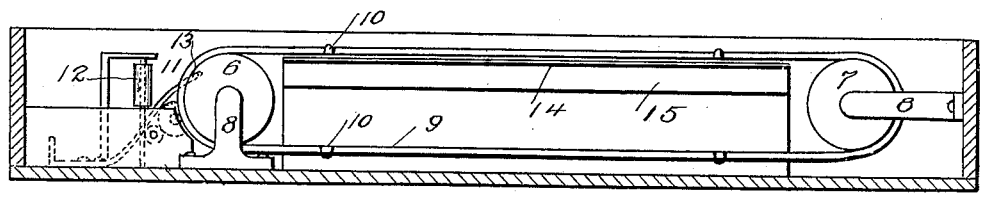

In the accompanying drawings, Figure 1 is a plan view of the apparatus, and Fig. 2 a longitudinal section on the line 2 2 of Fig. 1.

Referring specifically to the drawings, 5 denotes a box or casing containing rollers 6 and 7, respectively, which are journaled in suitable bearings 8, secured to the box in any convenient manner. The rollers carry a number of endless belts 9, two of such being shown, said belts carrying pointers 10 for a purpose to be described.

At 11 is indicated a spring-motor which is geared to the roller 6 in any suitable manner. The motor is provided with a governor 12 and brake 13. Any other form of motor can be used and it can be geared to either of the rollers. A card or sheet 14 is placed between the rollers, being supported on a tray or shelf 15, located in the box. The card is close to the belts 9, so that when the motor is started said belts will travel across the face of the card with the pointers 10 indicating thereon in a manner to be described.

A number of staffs 16 (corresponding to the number of belts) are drawn on the card. The staffs are divided into measures by bars 17. These measures are of equal length, and as the travel of the belts is rendered uniform by reason of the governor on the motor the indicators will pass over each measure at the same rate of speed. In common time, therefore, the duration of a whole note is fixed or established by the time required by the indicator to pass across the measure. The duration of a note of lesser time value than a whole note is fixed by the time required by the indicator to pass the space allotted the note, each note being allotted a space proportionate to its time value. Thus for a half-note two notes will be placed in a measure, each being allotted an equal space. For quarter-notes four notes are placed in the measure, and so on. The same principle can be employed where a number of notes, each having a different time value, occur in a measure. In this case, taking, for instance, a phrase in common time having in one measure a half-note, then two eighth-notes, and then a quarter-note, the first half portion of the measure will contain the half-note, one half of the remaining portion of the measure will contain the two eighth-notes, while the remainder (one-fourth of the whole) of the measure will contain the quarter-note. If each note is properly placed in its allotted space and is sounded when the pointer passes over it, it will be sounded in correct time. The same rule applies to phrases in triple or other time, the notes being arranged in the measures to conform to the different time. Rests and dotted notes will be positioned and treated in the same manner as above stated.

In addition to the card referred to a musical composition can be placed under the pointers and its time indicated in the same manner as heretofore described. By having two lines of pointers compositions for the piano and other instruments for which two staffs are used can be timed. A number of pointers will be placed on each belt and so arranged that when one pointer reaches the end of the line another will appear at the beginning thereof.

Having thus described my invention, what is claimed as new, and desired to be secured by Letters Patent, is—

An apparatus of the kind stated comprising a casing, a pair of rollers journaled in the casing, a shelf between the rollers, a pair of endless belts passing over the rollers and around the shelf and adjustable up and down on the rollers, a charactered sheet on the shelf, pointers carried by each of the belts and indicating on the aforesaid sheet, and a motor geared to one of the aforesaid rollers.

In testimony whereof I have signed my name to this specification in the presence of two subscribing witnesses.

BEN A. GOMME.

Witnesses:
     JOHN K. PIFFENBERG,
     JAMES MALLORY.